(12) United States Patent
Deng et al.

(10) Patent No.: US 12,214,671 B2
(45) Date of Patent: Feb. 4, 2025

(54) ROTARY PERMANENT MAGNET ELECTRODYNAMIC SUSPENSION DEVICE AND PERMANENT MAGNET ELECTRODYNAMIC SUSPENSION METHOD USING THE SAME

(71) Applicant: SOUTHWEST JIAOTONG UNIVERSITY, Chengdu (CN)

(72) Inventors: Zigang Deng, Chengdu (CN); Zhentao Ding, Chengdu (CN); Maoru Chi, Chengdu (CN); Mingming Li, Chengdu (CN); Sanchun Nie, Chengdu (CN); Yadong Ma, Chengdu (CN); Kaiwen Li, Chengdu (CN)

(73) Assignee: SOUTHWEST JIAOTONG UNIVERSITY, Chengdu (CN)

( * ) Notice: Subject to any disclaimer, the term of this patent is extended or adjusted under 35 U.S.C. 154(b) by 0 days.

(21) Appl. No.: 18/768,201

(22) Filed: Jul. 10, 2024

(65) Prior Publication Data

US 2024/0359566 A1   Oct. 31, 2024

Related U.S. Application Data

(63) Continuation of application No. PCT/CN2024/087295, filed on Apr. 11, 2024.

(30) Foreign Application Priority Data

Jun. 9, 2023   (CN) .......................... 202310678079.2

(51) Int. Cl.
*H02P 21/00* (2016.01)
*B60L 13/04* (2006.01)
(Continued)

(52) U.S. Cl.
CPC ............... *B60L 13/10* (2013.01); *B60L 13/04* (2013.01); *H02K 7/083* (2013.01); *H02K 21/24* (2013.01);
(Continued)

(58) Field of Classification Search
CPC .......... B60L 13/10; B60L 13/04; H02P 21/18; H02P 21/22; H02P 7/083; H02P 21/141; H02P 27/12; H02P 2207/05; H02K 21/21
See application file for complete search history.

(56) References Cited

U.S. PATENT DOCUMENTS

| 5,763,975 A | 6/1998 | Lurkens et al. |
| 2012/0091849 A1 | 4/2012 | Liu |

(Continued)

FOREIGN PATENT DOCUMENTS

| CN | 101154835 A | 4/2008 |
| CN | 104485793 A | 4/2015 |

(Continued)

OTHER PUBLICATIONS

Zigang Deng et al., "Dynamic test platform for high temperature superconducting magnetic bearings", Cryogenics and Superconductivity, Mar. 24, 2009, vol. 37, No. 3, pp. 2-4 only abstract considered.

*Primary Examiner* — Karen Masih

(57) ABSTRACT

A rotary permanent magnet electrodynamic suspension device includes drive systems, a suspension system, an isolation layer. The drive systems are symmetrically provided in an axial direction of the suspension system. The isolation layer is provided between the suspension system and each drive system. The suspension system includes a magnetic wheel, a non-magnetic conductor and a support. The non-magnetic conductor has electromagnetic induction with the magnetic wheel. The support and the magnetic wheel are both ring-shaped, and the magnetic wheel is (Continued)

sleeved on an outer circumference of the support. The drive systems are configured to drive the magnetic wheel to rotate through electromagnetic induction. The magnetic wheel includes an annular array of permanent magnets to form four pole pairs based on radial magnetization and tangential magnetization. A permanent magnet electrodynamic suspension using the device is also provided.

5 Claims, 7 Drawing Sheets

(51) Int. Cl.
*B60L 13/10* (2006.01)
*H02K 7/08* (2006.01)
*H02K 21/24* (2006.01)
*H02P 21/14* (2016.01)
*H02P 21/18* (2016.01)
*H02P 21/22* (2016.01)
*H02P 27/12* (2006.01)

(52) U.S. Cl.
CPC ............ *H02P 21/141* (2013.01); *H02P 21/18* (2016.02); *H02P 21/22* (2016.02); *H02P 27/12* (2013.01); *H02P 2207/05* (2013.01)

(56) References Cited

U.S. PATENT DOCUMENTS

| | | | |
|---|---|---|---|
| 2014/0191626 A1 | | 7/2014 | Hollis, Jr. et al. |
| 2019/0356260 A1* | | 11/2019 | Severson ................ H02P 25/22 |

FOREIGN PATENT DOCUMENTS

| | | | |
|---|---|---|---|
| CN | 107666232 A | | 2/2018 |
| CN | 109217597 A | | 1/2019 |
| CN | 111942162 A | | 11/2020 |
| CN | 112497126 A | | 3/2021 |
| CN | 116404772 A | | 7/2023 |
| DE | 102005009339 A1 | | 9/2006 |
| GB | 2066585 A | | 7/1981 |

* cited by examiner

ROTARY PERMANENT MAGNET ELECTRODYNAMIC SUSPENSION DEVICE AND PERMANENT MAGNET ELECTRODYNAMIC SUSPENSION METHOD USING THE SAME

CROSS-REFERENCE TO RELATED APPLICATIONS

This application is a continuation of International Patent Application No. PCT/CN2024/087295, filed on Apr. 11, 2024, which claims the benefit of priority from Chinese Patent Application No. 202310678079.2, filed on Jun. 9, 2023. The content of the aforementioned application, including any intervening amendments made thereto, is incorporated herein by reference in its entirety.

TECHNICAL FIELD

This application relates to magnetic levitation technology, and more particularly to a rotary permanent magnet electrodynamic suspension device and a permanent magnet electrodynamic suspension method using the same.

BACKGROUND

The existing permanent magnet electrodynamic suspension wheel technology employs a ring-shaped Halbach permanent magnet array, which rotates around a central axis at a certain speed to generate a radial and periodic rotating magnetic field. This magnetic field can induce a repulsive force through electromagnetic induction with conductors. The radial component of the repulsive force can serve as the levitation force to achieve the permanent magnet electrodynamic suspension. The tangential component of the repulsive force can act as the thrust force, enabling the non-adhesion driving between the wheels and the conductors. Thus, this technology can achieve the integrated levitation and propulsion, and exhibits great theoretical research significance and enormous application potential when applied to the non-contact power transmission devices. However, the existing permanent magnet electrodynamic suspension wheel technology typically employs a single-axis rotating motor as the driving source, which drives the magnetic wheel to rotate through an intermediate transmission mechanism or a coupling. This configuration results in a large axial dimension, making the assembly process cumbersome. Moreover, the resulting power system has complex structure, poor dynamic performance, low efficiency, and poor controllability.

SUMMARY

A purpose of the present disclosure is to provide a rotary permanent magnet electrodynamic suspension device to solve the above problems.

The technical solutions of the present disclosure are described as follows.

In a first aspect, the present disclosure provides a rotary permanent magnet electrodynamic suspension device, comprising:
a first drive system;
a second drive system;
a suspension system;
an isolation layer;
a speed control unit;
a signal acquisition unit;
a power supply unit;
an inverter circuit unit;

wherein the first drive system and the second drive system are symmetrically provided along an axial direction of the suspension system; the isolation layer is provided between the suspension system and each of the first drive system and the second drive system;

the suspension system comprises a magnetic wheel, a non-magnetic conductor and a support; the non-magnetic conductor is configured to have electromagnetic induction with the magnetic wheel; the support and the magnetic wheel are both ring-shaped; the magnetic wheel is sleeved on an outer circumference of the support; the first drive system and the second drive system are configured to drive the magnetic wheel to rotate through electromagnetic induction;

the suspension system is provided with a shaft and a bearing; the bearing is configured to support the support; the support has a rim structure, and is connected to the shaft through the bearing;

the speed control unit is electrically connected to the inverter circuit unit, and is configured to transmit a pulse width modulation (PWM) signal to the inverter circuit unit;

the power supply unit is connected to two ends of the inverter circuit unit to provide a power to the inverter circuit unit;

the inverter circuit unit is electrically connected to the first drive system and the second drive system, and is configured to input a three-phase alternating-current (AC) excitation to the first drive system and the second drive system;

the signal acquisition unit is configured to collect a rotational speed, a levitation force and a thrust force of the magnetic wheel, and the three-phase AC excitation, and feed the rotational speed, the levitation force and the thrust force of the magnetic wheel, and the three-phase AC excitation back to the speed control unit;

the magnetic wheel is composed of a ring-shaped array of permanent magnets; and the permanent magnets are configured to form four pole pairs based on a radial magnetization pattern and a tangential magnetization pattern;

each of the first drive system and the second drive system comprises a rotor component, a winding, a stator component, and an end cover; the rotor component, the winding, the stator component, and the end cover are sequentially arranged; the rotor component, the winding and the stator component are ring-shaped; the rotor component comprises a magnetically-conductive layer and an electrically-conductive layer; the magnetically-conductive layer is provided on a side of each of the first drive system and the second drive system near the isolation layer; and the isolation layer, the magnetically-conductive layer and the electrically-conductive layer are sleeved on the bearing, and are connected to the bearing; the winding, the stator component and the end cover are sleeved on the shaft, and are fixedly connected to the shaft.

In an embodiment, the stator component comprises a stator yoke and a stator teeth portion; the stator component is fixedly connected to the shaft through the end cover; and there is an air gap between the stator component and the electrically-conductive layer.

In an embodiment, the stator component has 24 slots and 20 poles, and the number of slots per pole per phase of the stator component is $2/5$; the winding is a concentrated three-phase winding, and wound in a double-layer form around the stator teeth portion; and a pitch of the winding is 1 slot, and a fundamental winding factor of the winding is 0.933.

In an embodiment, the speed control unit comprises a speed loop, a current loop, a flux linkage loop, a coordinate transformation module, a flux linkage calculation module, and a slip calculation module; and the speed control unit is configured to output the PWM signal through a space vector pulse width modulation method.

In a second aspect, the present disclosure provides a permanent magnet electrodynamic suspension method using the rotary permanent magnet electrodynamic suspension device, wherein the first drive system being configured as a front-end drive system; the second drive system being configured as a rear-end drive system, and the permanent magnet electrodynamic suspension method comprising:

outputting, by the speed control unit, the PWM signal to the inverter circuit unit;

converting by the inverter circuit unit, a direct-current (DC) excitation into the three-phase AC excitation based on the PWM signal, and transmitting the three-phase AC excitation to the front-end drive system and the rear-end drive system;

after receiving the three-phase AC excitation, generating, by the front-end drive system, a first torque around the shaft to drive the magnetic wheel, the support, the isolation layer, and the rotor component of the front-end drive system to synchronously rotate in a non-contact manner, wherein after receiving the three-phase AC excitation, the winding within the front-end drive system generates a magnetic induction line, and forms a closed loop and a traveling wave magnetic field within the front-end drive system; the closed loop has a cyclic structure formed by sequential connection of a first tooth of the stator teeth portion, the air gap, the electrically-conductive layer, the magnetically-conductive layer, the electrically-conductive layer, the air gap, a second tooth of the stator teeth portion adjacent to the first tooth, and the stator yoke of the front-end drive system;

after receiving the three-phase AC excitation, generating, by the rear-end drive system, a second torque around the shaft to drive the magnetic wheel, the support, the isolation layer, and the rotor component of the rear-end drive system to synchronously rotate in a non-contact manner; wherein after receiving the three-phase AC excitation, the winding within the rear-end drive system generates a magnetic induction line, and forms a closed loop and a traveling wave magnetic field within the rear-end drive system; the closed loop has a cyclic structure formed by sequential connection of a first tooth of the stator teeth portion, the air gap, the electrically-conductive layer, the magnetically-conductive layer, the electrically-conductive layer, the air gap, a second tooth of the stator teeth portion adjacent to the first tooth, and the stator yoke of the rear-end drive system; and detecting, by the signal acquisition unit, the rotational speed, the thrust force, and the levitation force of the magnetic wheel, and the three-phase AC excitation in real time, and feeding, by the signal acquisition unit, the rotational speed, the thrust force and the levitation force of the magnetic wheel, the three-phase AC excitation back to the speed control unit.

The benefits of the present disclosure are described as follows.

Compared to the traditional rotary permanent magnet electrodynamic suspension systems, the present disclosure optimizes the driving form of the rotating motor for the magnetic wheel. Specifically, the rotating motor and the magnetic wheel are integrally designed, such that the axial length of the system is reduced, thereby saving the assembly space, and optimizing the system layout. The device provided herein conforms to the development trends of high integration and light weight. Additionally, the drive systems of the present disclosure adopt a bilateral symmetrical arrangement, which can improve the space and structural utilization and enhance the system output capacity. The axial forces of the system counteract each other, balancing the bearing load and ensuring the reliable operation.

Other features and advantages of this application will be set forth below, and will partly become apparent from the specification or be understood by implementing the embodiments of this application. The objects and other advantages of this application may be realized and obtained by means of the structure particularly indicated in the specification, appended claims and accompanying drawings.

BRIEF DESCRIPTION OF THE DRAWINGS

In order to clarify the technical solutions of the embodiments of the present disclosure, a brief introduction to the drawings required in the embodiments will be provided below. It should be understood that presented in the following drawings are only some embodiments of the present disclosure, and should not be construed as limiting the scope of the disclosure. For those skilled in the art, other related drawings can be obtained based on these drawings without making creative effort.

Figure 1:
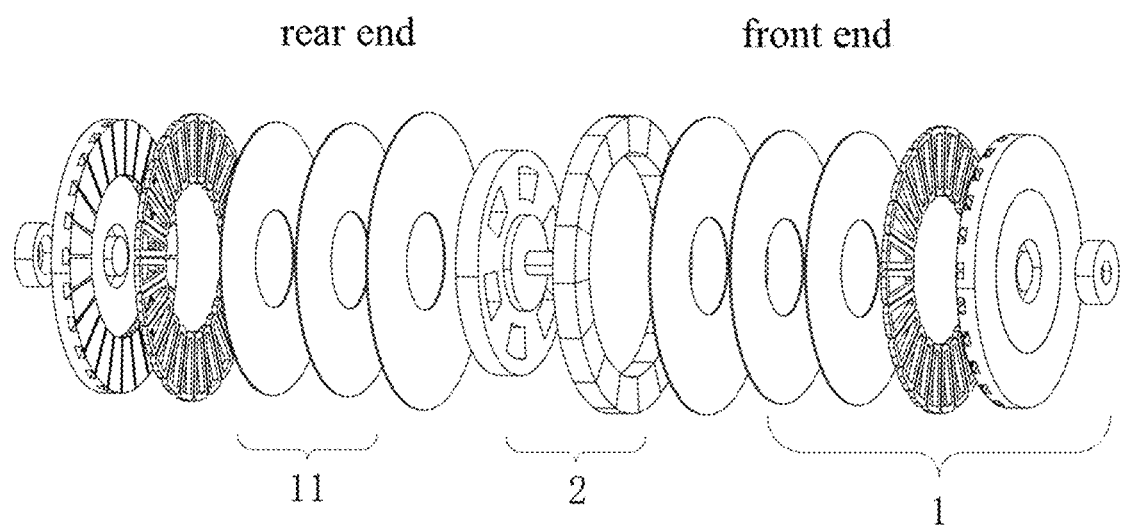
FIG. 1 is an exploded view of a rotary permanent magnet electrodynamic suspension device according to an embodiment of the present application.

In the figures: 1—first drive system, 11—rotor component, 111—magnetically-conductive layer, 112—electrically-conductive layer, 12—winding, 13—stator component, 14—end cover, 2—suspension system, 21—magnetic wheel, 22—non-magnetic conductor, 23—support, 24—shaft, 25—bearing, 3—isolation layer, 4—speed control unit, 5—signal acquisition unit, 6—power supply unit, and 7—inverter circuit unit.

DETAILED DESCRIPTION OF EMBODIMENTS

To make the objects, technical solutions and advantages of the embodiments of this application clearer, the technical solutions of the embodiments of this application will be clearly and completely described below in conjunction with the accompanying drawings. It is obvious that described below are some embodiments instead of all embodiments of this application. The components of embodiments of this application described and illustrated in the drawings herein can be generally arranged and designed in different configurations. Accordingly, the following detailed description of the embodiments of this application provided in the accompanying drawings is not intended to limit the protection scope of this application, but is merely used for illustrating the selected embodiments of this application. Based on the embodiments in this application, all other embodiments obtained by those skilled in the art without making creative effort shall fall within the protection scope of this application.

It should be noted that similar symbols and letters denote similar items in the following drawings, so that once an item has been defined in one drawing, it is not required to further define and explain such item in subsequent drawings. As used herein, the terms "first", "second", etc. are used only for distinguishment, and are not to be understood as indicating or implying relative importance.

Embodiment 1

Figure 2:
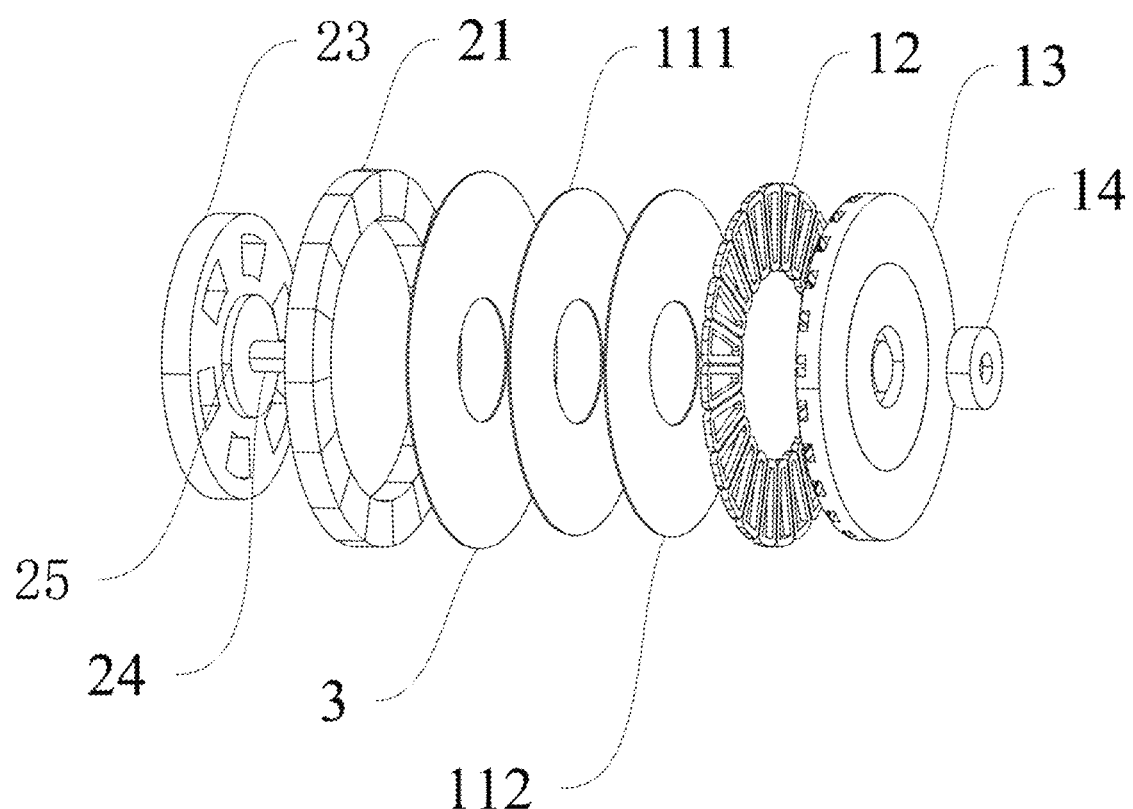
FIG. 2 is a structural diagram of a drive system according to an embodiment of the present application.
Figure 3:
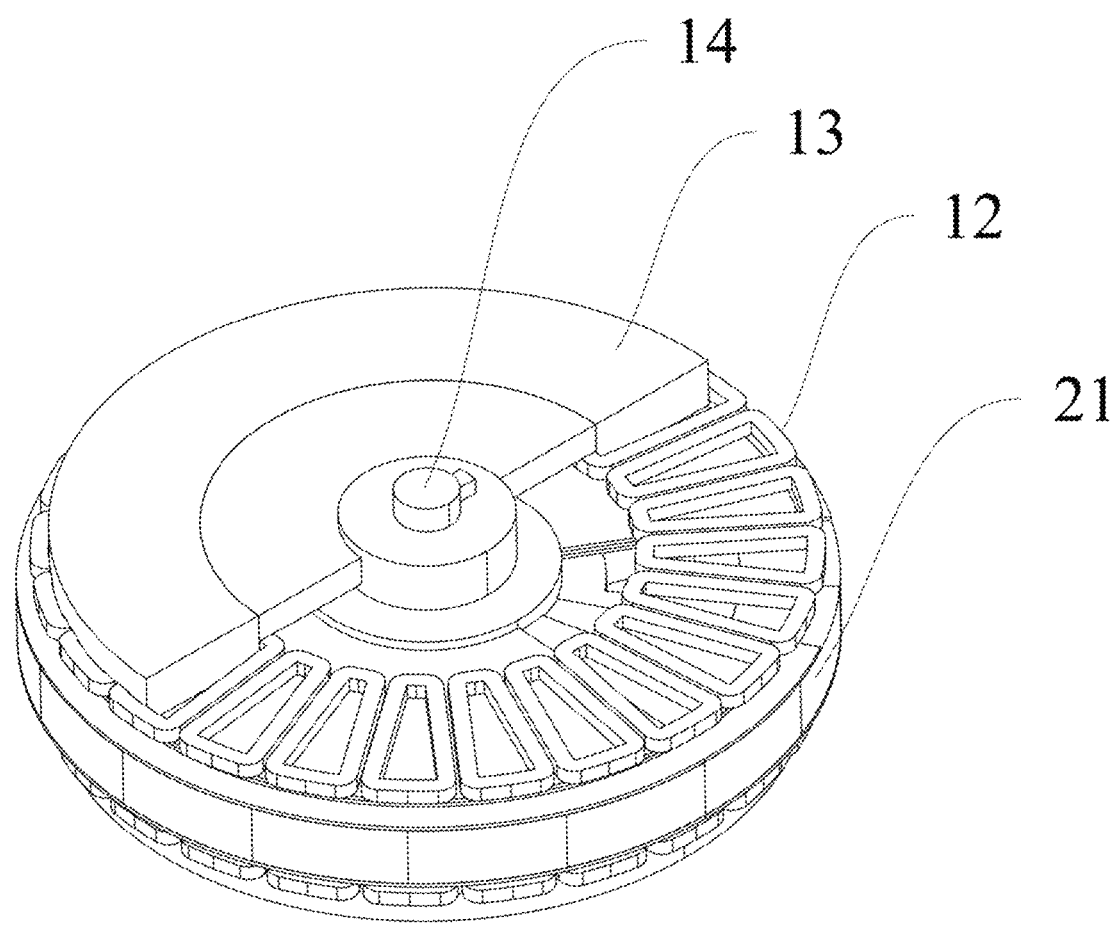
FIG. 3 schematically illustrates the assembly of the rotary permanent magnet electrodynamic suspension device according to an embodiment of the present application.

Referring to an embodiment shown in FIGS. 1-3, a rotary permanent magnet electrodynamic suspension device is provided, which includes drive systems, a suspension system 2 and an isolation layer 3. The drive systems include a first drive system 1 and a second drive system. The suspension system 2 is symmetrically and axially provided with the first drive system 1 and second drive system, and the isolation layer 3 is provided between the suspension system 2 and each of the first drive system 1 and the second drive system.

The suspension system 2 includes a magnetic wheel 21, a non-magnetic conductor 22 and a support 23. The non-magnetic conductor 22 is configured to have electromagnetic induction with the magnetic wheel 21, the support 23 and the magnetic wheel 21 are both ring-shaped, and the magnetic wheel 21 is sleeved on the outer circumference of the support 23. The suspension system 2 is configured to generate a magnetic induction line to drive the rotation of the magnetic wheel 21.

In this embodiment, since the suspension system 2 is axially and symmetrically equipped with the first drive system and the second drive system. This configuration improves the utilization of space and structure. The simultaneous operation of the first drive system 1 and the second drive system can enhance the system's output capacity. Additionally, as the axial forces of the systems counteract each other, the bearing load is balanced, ensuring reliable system operation.

In this embodiment, the first drive system 1 and the second drive system generate an electromagnetic torque when powered on, directly driving the suspension system 2 to rotate and interact with the non-magnetic conductor 22 to produce a levitation force ($F_L$) and a thrust force ($F_T$). The levitation force ($F_L$) allows the suspension system 2 to achieve a levitation height ($h_1$) of 5 to 20 mm.

The isolation layers 3 have an annular structure and are installed on both sides of the magnetic wheel 21 to prevent direct contact between the rotor components 11 of the first drive system 1 and the second drive system and the suspension system 2.

The non-magnetic conductor 22 can be in the form of plates, grids, or coils; it can be made of copper or aluminum materials; the thickness of the non-magnetic conductor 22 ($h_2$) is 6-10 mm.

Based on the above embodiment, the magnetic wheel 21 is composed of an annular Halbach array of permanent magnets. The permanent magnets are magnetized radially and tangentially to form four pole pairs. Preferably, the outer surface of the magnetic wheel 21 is wrapped with a nylon sleeve or rubber to prevent bumps and damage to the magnetic wheel 21.

Based on the above embodiment, the suspension system 2 is also provided with a shaft 24 and a bearing 25. The bearing 25 supports the support 23. The support 23 has a rim structure and is connected to the shaft 24 through the bearing 25.

Preferably, the support 23 has a rim structure, with its outer edge used for mounting the magnetic wheel 21, and its inner side supported by the bearings 25 and connected to the shaft 24. The support 23 is made of aluminum alloy material.

Specifically, the isolation layer 3 is sleeved on the outer edge of the bearing 25.

Based on the above embodiment, each of the first drive system 1 and the second drive system includes a rotor component 11, a winding 12, a stator component 13, and an end cover 14 in sequence. The rotor component 11, the winding 12, and the stator component 13 are all ring-shaped, and each of the rotor components 11 includes a magnetically-conductive layer 111 and an electrically-conductive layer 112, with the magnetically-conductive layer 111 located on the side of each of the first drive system 1 and the second drive system near the isolation layer 3.

Preferably, the electrically-conductive layer 112 is made of copper or aluminum materials, and the magnetically-conductive layer 111 is made of steel.

Based on the above embodiment, the isolation layer 3, the magnetically-conductive layer 111, and the electrically-conductive layer 112 are all sleeved on the bearing 25 and are fixedly connected to the bearing 25. The winding 12, the stator component 13, and the end cover 14 are all sleeved on the shaft 24 and are connected to the shaft 24.

Based on the above embodiment, each of the stator components 13 includes a stator yoke and stator teeth portion. The stator component 13 is fixedly connected to the shaft 24 through the end cover 14, and there is an air gap between the stator component 13 and the electrically-conductive layer 112.

Preferably, the thickness of the air gap (g) is 1 to 2 mm.

Figure 4:
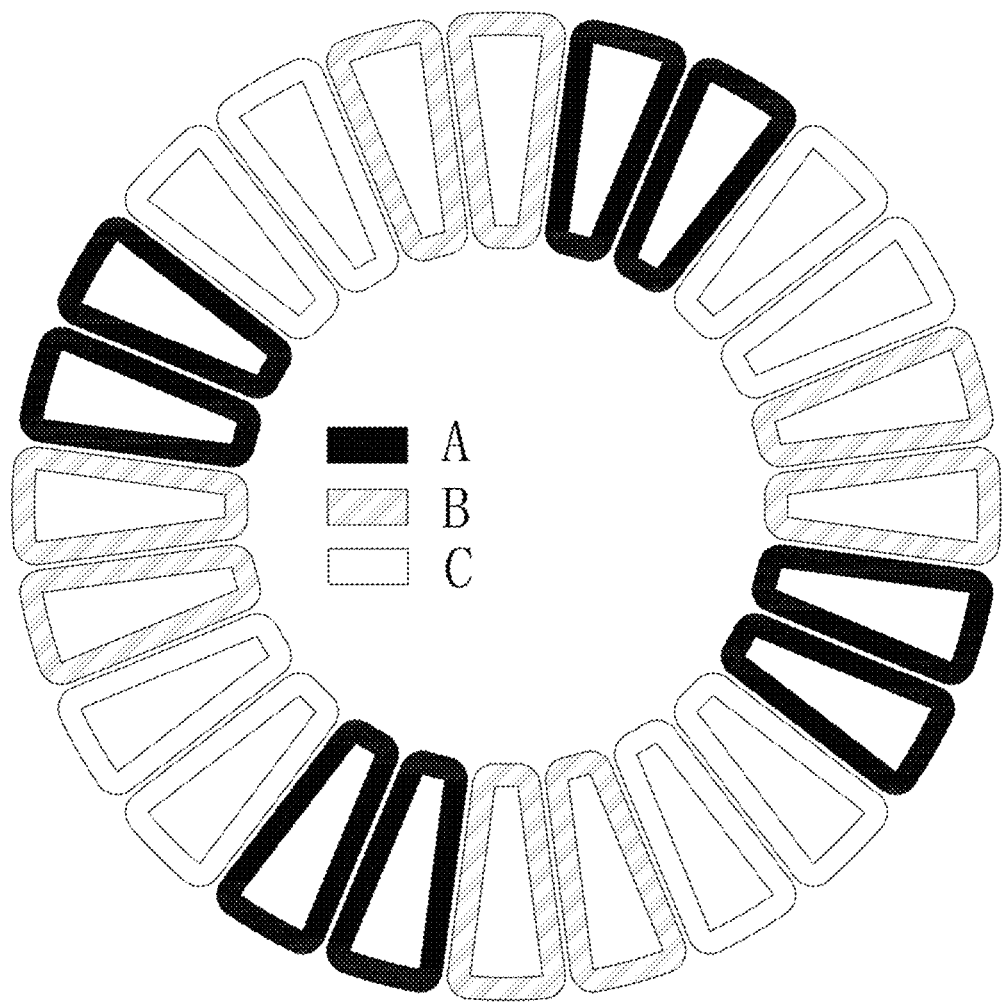
FIG. 4 is a schematic diagram of a winding grouping according to an embodiment of the present application.

Referring to FIG. 4, based on the above embodiment, the number of slots per pole per phase (q) of the stator component 13 is ⅖, with 24 slots and 20 poles. The winding 12 is a concentrated three-phase winding, consisting of three groups: A, B, and C, and is wound in a double-layer form on the stator teeth. The pitch of the winding 12 (y) is 1 slot, and the fundamental winding factor (Kdp1) of the winding 12 is 0.933.

In this embodiment, the adoption of a concentrated three-phase winding can effectively reduce the length of the winding end, thus reducing losses, costs, and installation space. It can also improve the sinusoidal quality of the magnetic field and reduce output fluctuations.

Based on the above embodiment, the rotary permanent magnet electrodynamic suspension device further includes a speed control unit 4, a signal acquisition unit 5, a power supply unit 6, and an inverter circuit unit 7.

The speed control unit 4 is electrically connected to the inverter circuit unit 7 and transmits PWM signals to the inverter circuit unit 7.

The power supply unit 6 is connected to both ends of the inverter circuit unit 7 to provide power to the inverter circuit unit 7.

The inverter circuit unit 7 is electrically connected to the front-end drive system and the rear-end drive system, and inputs a three-phase AC excitation to the front-end drive system and the rear-end drive system.

The signal acquisition unit 5 is configured to collect the rotational speed the levitation force and the thrust force of the magnetic wheel 21, and the three-phase AC excitation.

Specifically, the inverter circuit unit 7 adopts a two-level voltage-type inverter and consists of 3 sets (6 in total) of Insulated Gate Bipolar Transistor (IGBT) switches. The conduction modes of the IGBT switches within the same set are opposite; when one IGBT switch in the same set is turned on, the other must be turned off.

Furthermore, the power supply unit 6 adopts a DC link voltage (Udc) and applies to both ends of the inverter circuit unit. The inverter circuit, guided by the PWM signals, controls the switching of the IGBTs to convert the DC excitation into AC excitation signals $i_a$, $i_b$, and $i_c$.

The signal acquisition unit 5 is configured to collect signals such as the rotational speed, the levitation force, the thrust force, and the AC excitation ($i_a$, $i_b$, and $i_c$) of the magnetic wheel 21.

Based on the above embodiment, the speed control unit 4 includes a speed loop, a current loop, a flux linkage loop, a coordinate transformation module, a flux linkage calculation module, and a slip calculation module. The speed control unit 4 outputs PWM signals through the space vector pulse width modulation method (SVPWM).

In this embodiment, the power supply unit 6 and the speed control unit 4 adopt a speed closed-loop control strategy, which can meet the operating conditions of uniform speed, acceleration, deceleration, and braking of the magnetic wheel in real time, and has good dynamic performance and resistance to external interference.

Preferably, according to power requirements, this device can reasonably add the suspension system and the drive system axially to form a multi-layer structure.

Embodiment 2

Figure 5:
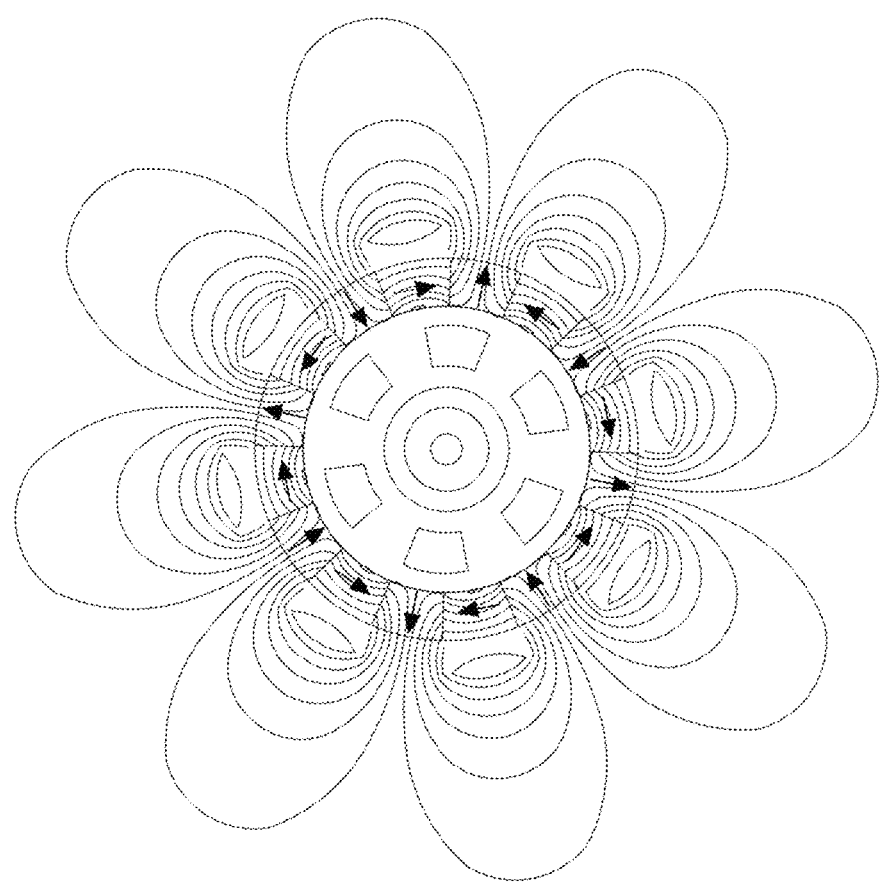
FIG. 5 is a schematic diagram of the distribution of a magnetic field generated by a magnetic wheel according to an embodiment of the present application.
Figure 6:
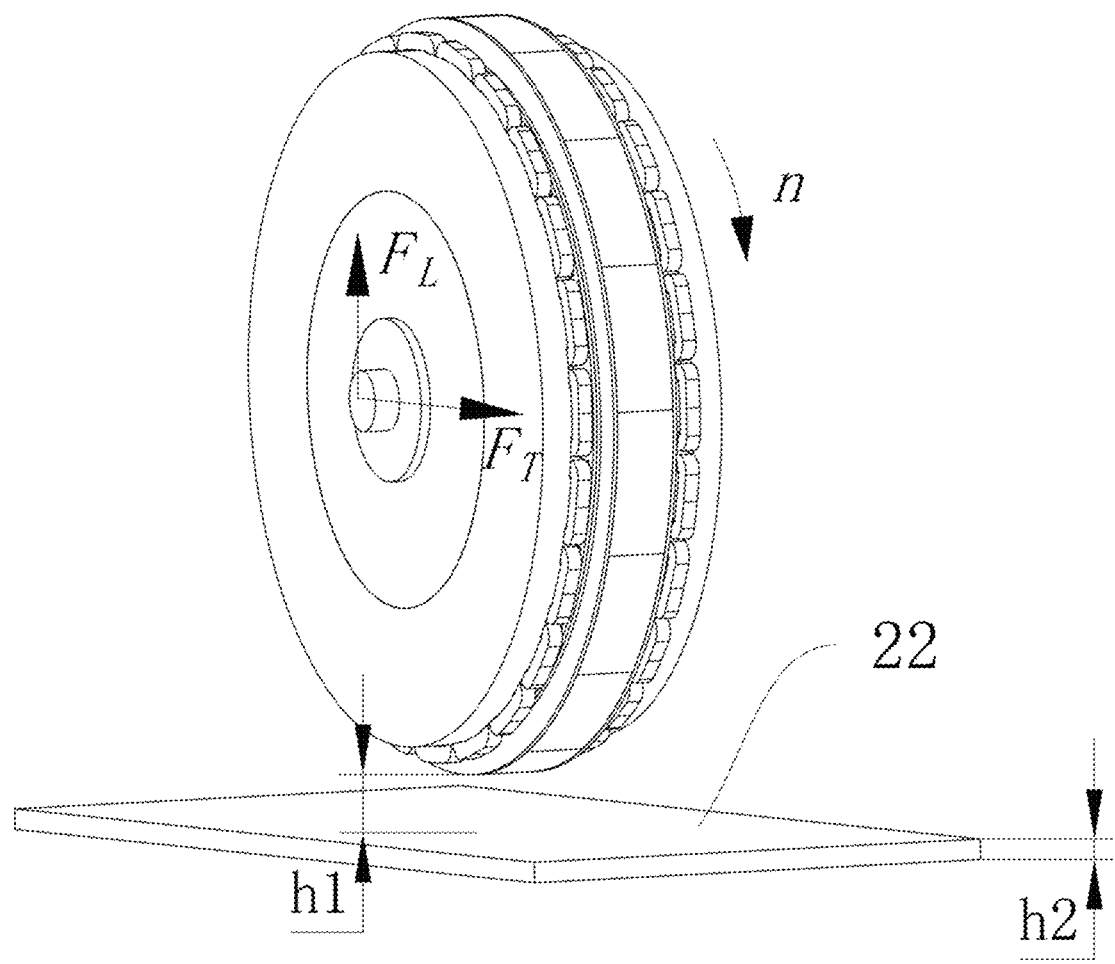
FIG. 6 schematically shows the operation of the rotary permanent magnet electrodynamic suspension device according to an embodiment of the present application.
Figure 7:
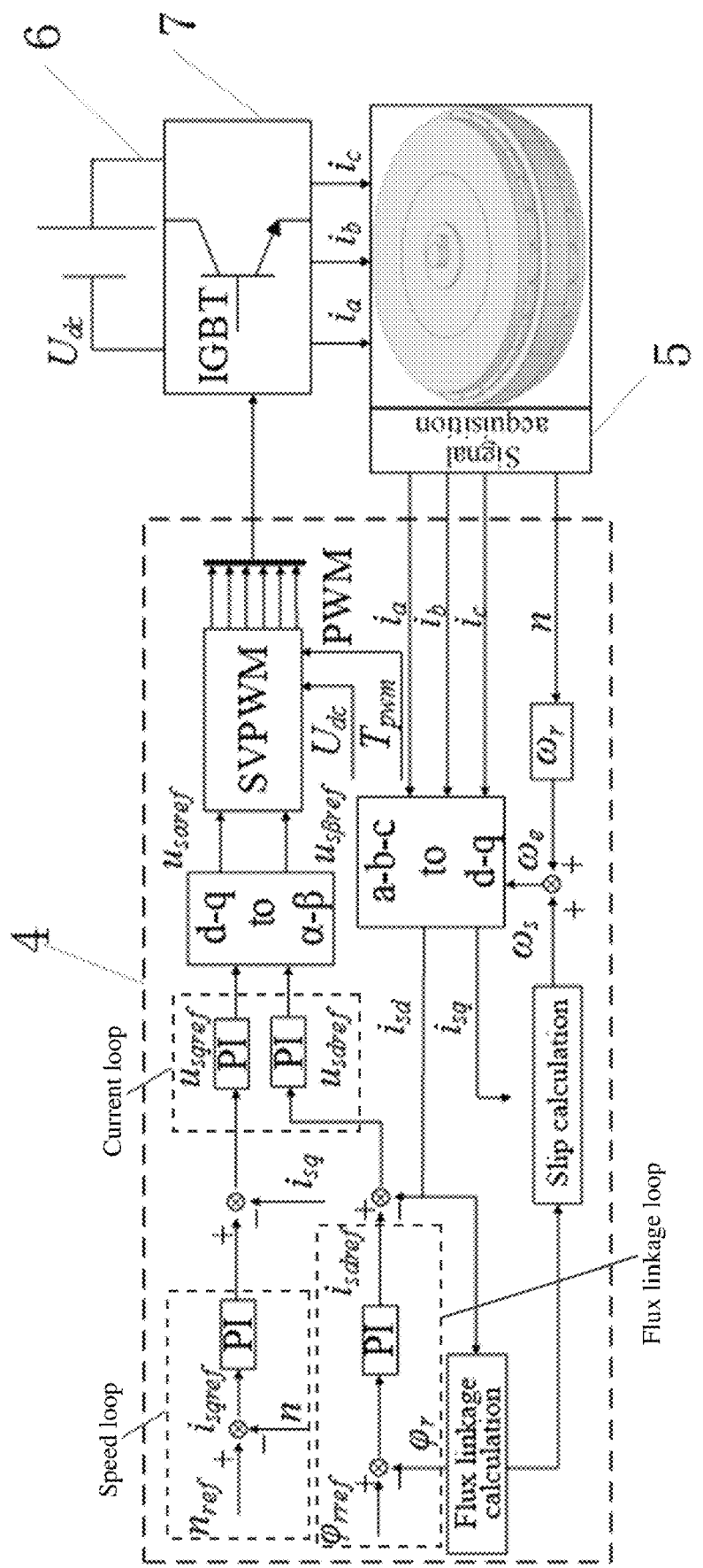
FIG. 7 shows a circuit of the rotary permanent magnet electrodynamic suspension device according to an embodiment of the present application.

Referring to FIGS. 5-7, the permanent magnet electrodynamic suspension method is provided. The front-end drive system and the rear-end drive system are symmetrically arranged along the axial direction of the suspension system 2. The method includes the following steps.

The speed control unit 4 outputs PWM signals to the inverter circuit unit 7. The speed control process of the speed control unit 4 is as follows. The three-phase current excitations ($i_a$, $i_b$, $i_c$) are monitored and collected by the signal acquisition unit 5, and then transformed through the coordinate transformation module (a-b-c to d-q) to obtain the excitation current ($i_{sd}$) and the torque current ($i_{sq}$). The excitation current ($i_{sd}$) and torque current ($i_{sq}$) are processed by the flux linkage calculation module and the slip calculation module respectively to obtain the rotor flux linkage ($\varphi_r$) and the slip signal ($\omega_s$). The rotor flux linkage ($\varphi_r$) is compared with the flux linkage reference signal ($\varphi_{ref}$), to output the excitation current reference signal ($i_{sdref}$) through a PI controller. The rotational speed (n) is monitored and collected by the signal acquisition unit 5 and then transformed and added to the slip signal ($\omega_s$) to obtain the synchronous angular frequency signal ($\omega_e$) for coordinate transformation. The rotational speed (n) is compared with the speed reference signal ($n_{ref}$) to output the torque current reference signal ($i_{sqref}$) through a PI controller. The excitation current ($i_{sd}$) and torque current ($i_{sq}$) are compared with the excitation current reference signal ($i_{sdref}$) and torque current reference signal ($i_{sqref}$) respectively to output the voltage signals ($u_{sdref}$ and $u_{sqref}$) through a PI controller. The voltage signals ($u_{sdref}$ and $u_{sqref}$) are then converted to the voltage signals ($u_{s\alpha ref}$ and $u_{s\beta ref}$) through the coordinate transformation module (d-q to a-B). Using space vector pulse width modulation (SVPWM) technology, the voltage signals ($u_{s\alpha ref}$ and $u_{s\beta ref}$) are used to generate six PWM signals. The DC terminal voltage and modulation period for the SVPWM are $u_{dc}$ and $T_{pwm}$, respectively.

The inverter circuit unit 7 converts the DC excitation into the three-phase AC excitation based on the PWM signal and transmits the three-phase AC excitation to the front-end drive system and the rear-end drive system.

Specifically, based on the PWM signals output by the speed control unit 4, the inverter circuit unit 7 controls the switching on and off of the IGBTs and transmits three-phase current excitations ($i_a$, $i_b$, $i_c$) to the windings 12 of both the front-end drive system and the rear-end drive system.

After receiving the three-phase AC excitation, the front-end drive system generates the torque of the front-end drive system around the shaft 24 to drive the magnetic wheel 21, the support 23, the isolation layer 3, and the rotor component 11 of the front-end drive system to synchronously rotate in a non-contact manner.

Specifically, after receiving the three-phase AC excitations ($i_a$, $i_b$, $i_c$), the winding 12 within the front-end drive system generates a magnetic induction line and forms a closed loop and a traveling wave magnetic field within the front-end drive system.

The electrically-conductive layer 112 of the front-end drive system interacts with the traveling wave magnetic field to generate an electromagnetic torque along the direction of the traveling wave magnetic field, thus forming a torque around the shaft 24 for the front-end drive system.

The closed loop has a cyclic structure formed by the sequential connection of the first tooth of the stator teeth portion, the air gap, the electrically-conductive layer 112, the magnetically-conductive layer 111, the electrically-conductive layer 112, the air gap, the second tooth of the stator teeth portion adjacent to the first tooth, the stator yoke of the front-end drive system, and a third tooth of the stator teeth portion.

After receiving the three-phase AC excitation, the rear-end drive system generates the torque of the rear-end drive system around the shaft 24 to drive the magnetic wheel 21, the support 23, the isolation layer 3, and the rotor component 11 of the rear-end drive system to synchronously rotate in a non-contact manner.

Specifically, the working principle of the rear-end drive system is the same as that of the front-end drive system and will not be repeated here.

The magnetic wheel 21 generates a magnetic field during rotation. The interaction between the non-magnetic conductor 22 and the magnetic wheel 21 produces a levitation force ($F_L$) and a thrust force ($F_T$). The levitation force ($F_L$) causes the magnetic wheel 21 to achieve a levitation height ($h_1$) of 5 to 20 mm.

The signal acquisition unit 5 detects the rotational speed (n) of the magnetic wheel 21, the three-phase AC excitations ($i_a$, $i_b$, $i_c$), the levitation force ($F_L$), and the thrust force ($F_T$) in real time and feeds this information back to the speed control unit 4.

In this embodiment, the drive motor is integrated with the magnetic wheel, which significantly reduces the axial dimension of the system. The magnetic wheel can achieve non-contact rotational operation, eliminating the need for an intermediate transmission mechanism between the rotating motor and the magnetic wheel found in traditional rotary permanent magnet electric suspension systems. This simplifies the system structure and improves the dynamic response characteristics of the system. Additionally, the winding of the drive system uses a concentrated winding, which is easy to wind, effectively reduces the length of the winding end, and decreases copper losses in the winding.

Finally, the rotational operation of the suspension system 2 adopts an annular induction drive featuring direct drive, high operational reliability, low cost, and ease of manufacture and maintenance.

Described above are merely preferred embodiments of this application, and are not intended to limit this application. It should be understood by those skilled in the art that any modifications, equivalent substitutions, and improvements made without departing from the spirit of this application shall fall in the scope of this application defined by the appended claims.

The present disclosure has been described in detail above with reference to several embodiments, but is not limited thereto. It should be noted that for those skilled in the art, those modifications and improvements made without departing from the scope of the present disclosure shall fall within the scope of the present disclosure defined by the appended claims.

What is claimed is:

1. A rotary permanent magnet electrodynamic suspension device, comprising:
    a first drive system;
    a second drive system;
    a suspension system;
    an isolation layer;
    a speed control unit;
    a signal acquisition unit;
    a power supply unit;
    an inverter circuit unit;
    wherein the first drive system and the second drive system are symmetrically provided along an axial direction of the suspension system; the isolation layer is provided between the suspension system and each of the first drive system and the second drive system;
    the suspension system comprises a magnetic wheel, a non-magnetic conductor and a support; the non-magnetic conductor is configured to have electromagnetic induction with the magnetic wheel; the support and the magnetic wheel are both ring-shaped; the magnetic wheel is sleeved on an outer circumference of the support; the first drive system and the second drive system are configured to drive the magnetic wheel to rotate through electromagnetic induction;
    the suspension system is provided with a shaft and a bearing; the bearing is configured to support the support; the support has a rim structure, and is connected to the shaft through the bearing;
    the speed control unit is electrically connected to the inverter circuit unit, and is configured to transmit a pulse width modulation (PWM) signal to the inverter circuit unit;
    the power supply unit is connected to two ends of the inverter circuit unit to provide a power to the inverter circuit unit;
    the inverter circuit unit is electrically connected to the first drive system and the second drive system, and is configured to input a three-phase alternating-current (AC) excitation to the first drive system and the second drive system;
    the signal acquisition unit is configured to collect a rotational speed, a levitation force and a thrust force of the magnetic wheel, and the three-phase AC excitation, and feed the rotational speed, the levitation force and the thrust force of the magnetic wheel, and the three-phase AC excitation back to the speed control unit;
    the magnetic wheel is composed of a ring-shaped array of permanent magnets; and the permanent magnets are configured to form four pole pairs based on a radial magnetization pattern and a tangential magnetization pattern;
    each of the first drive system and the second drive system comprises a rotor component, a winding, a stator component, and an end cover; the rotor component, the winding, the stator component, and the end cover are sequentially arranged; the rotor component, the winding and the stator component are ring-shaped; the rotor component comprises a magnetically-conductive layer and an electrically-conductive layer; the magnetically-conductive layer is provided on a side of each of the first drive system and the second drive system near the isolation layer; and
    the isolation layer, the magnetically-conductive layer and the electrically-conductive layer are sleeved on the bearing, and are connected to the bearing; the winding, the stator component and the end cover are sleeved on the shaft, and are fixedly connected to the shaft.

2. The rotary permanent magnet electrodynamic suspension device of claim 1, wherein the stator component comprises a stator yoke and a stator teeth portion; the stator component is fixedly connected to the shaft through the end cover; and there is an air gap between the stator component and the electrically-conductive layer.

3. The rotary permanent magnet electrodynamic suspension device of claim 2, wherein the stator component has 24 slots and 20 poles, and the number of slots per pole per phase of the stator component is $2/5$; the winding is a concentrated three-phase winding, and wound in a double-layer form around the stator teeth portion; and a pitch of the winding is 1 slot, and a fundamental winding factor of the winding is 0.933.

4. The rotary permanent magnet electrodynamic suspension device of claim 1, wherein the speed control unit comprises a speed loop, a current loop, a flux linkage loop, a coordinate transformation module, a flux linkage calculation module, and a slip calculation module; and the speed control unit is configured to output the PWM signal through a space vector pulse width modulation method.

5. A permanent magnet electrodynamic suspension method using the rotary permanent magnet electrodynamic suspension device of claim 2, the first drive system being configured as a front-end drive system; the second drive system being configured as a rear-end drive system, and the permanent magnet electrodynamic suspension method comprising:
    outputting, by the speed control unit, the PWM signal to the inverter circuit unit;
    converting by the inverter circuit unit, a direct-current (DC) excitation into the three-phase AC excitation based on the PWM signal, and transmitting the three-phase AC excitation to the front-end drive system and the rear-end drive system;
    after receiving the three-phase AC excitation, generating, by the front-end drive system, a first torque around the shaft to drive the magnetic wheel, the support, the isolation layer, and the rotor component of the front-end drive system to synchronously rotate in a non-contact manner, wherein after receiving the three-phase AC excitation, the winding within the front-end drive system generates a magnetic induction line, and forms a closed loop and a traveling wave magnetic field within the front-end drive system; the closed loop has a cyclic structure formed by sequential connection of a first tooth of the stator teeth portion, the air gap, the electrically-conductive layer, the magnetically-conductive layer, the electrically-conductive layer, the air gap, a second tooth of the stator teeth portion adjacent to the first tooth, the stator yoke of the front-end drive system, and a third tooth of the stator teeth portion;

after receiving the three-phase AC excitation, generating, by the rear-end drive system, a second torque around the shaft to drive the magnetic wheel, the support, the isolation layer, and the rotor component of the rear-end drive system to synchronously rotate in a non-contact manner; and detecting, by the signal acquisition unit, the rotational speed, the thrust force, and the levitation force of the magnetic wheel, and the three-phase AC excitation in real time, and feeding, by the signal acquisition unit, the rotational speed, the thrust force, and the levitation force of the magnetic wheel, and the three-phase AC excitation back to the speed control unit.

* * * * *